United States Patent
Mokudai et al.

(10) Patent No.: US 10,570,255 B2
(45) Date of Patent: Feb. 25, 2020

(54) METHOD OF PRODUCING POLYARYLENE SULFIDE

(71) Applicant: Kureha Corporation, Tokyo (JP)

(72) Inventors: Haruki Mokudai, Tokyo (JP); Akihiro Konno, Tokyo (JP); Hiroyuki Sato, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/759,855

(22) PCT Filed: Sep. 30, 2016

(86) PCT No.: PCT/JP2016/079125
§ 371 (c)(1),
(2) Date: Mar. 14, 2018

(87) PCT Pub. No.: WO2017/057731
PCT Pub. Date: Apr. 6, 2017

(65) Prior Publication Data
US 2018/0244848 A1    Aug. 30, 2018

(30) Foreign Application Priority Data
Sep. 30, 2015    (JP) ................... 2015-195113

(51) Int. Cl.
*C08G 75/0254*    (2016.01)
*C08G 75/0213*    (2016.01)
*C08G 75/025*    (2016.01)

(52) U.S. Cl.
CPC ....... *C08G 75/0254* (2013.01); *C08G 75/025* (2013.01); *C08G 75/0213* (2013.01)

(58) Field of Classification Search
CPC ............... C08G 75/14; C08G 75/0263; C08G 75/0268; C08G 75/0259; C08G 75/025; B30B 9/28
See application file for complete search history.

(56) References Cited

U.S. PATENT DOCUMENTS

2006/0084785 A1    4/2006  Sato et al.
2007/0265425 A1    11/2007 Suzuki et al.

FOREIGN PATENT DOCUMENTS

| CN | 103819675 A | 5/2014 |
|----|-------------|--------|
| CN | 104292462 A | 1/2015 |
| JP | 2001181394 A | 7/2001 |
| JP | 2009185143 A | 8/2009 |
| JP | 4608715 B2 | 1/2011 |
| JP | 2014047218 A | 3/2014 |
| WO | WO2004060972 A1 | 7/2004 |
| WO | WO2006046748 A1 | 5/2006 |

OTHER PUBLICATIONS

International Search Report for PCT/JP2016/079125 with dated Nov. 22, 2016.
Office Action issued to KR Patent Application No. 10-2018-7006984, dated Jan. 30, 2019, 11 pgs.
Notification of Reasons for Refusal issued in the JP Patent Application No. 2017-543645, dated Oct. 2, 2018, 6 pgs.
Office Action issued to CN Patent Application No. 201680053130, dated Sep. 11, 2019, 12 pgs.

*Primary Examiner* — Shane Fang
(74) *Attorney, Agent, or Firm* — Abel Schillinger, LLP

(57) ABSTRACT

Provided is a method of producing polyarylene sulfide at low cost while productivity enhancement and resource saving are attempted by avoiding the use of a complicated step and special apparatus (facility). The method of producing polyarylene sulfide according to an embodiment of the present invention includes: a preparation step of preparing a mixture containing an organic amide solvent, a sulfur source, a dihalo aromatic compound, and an alkali metal hydroxide in an amount less than an equimolar amount relative to an amount of the sulfur source; a first-stage polymerization step of initiating a polymerization reaction by heating the mixture, and producing a prepolymer having a dihalo aromatic compound conversion ratio of 50% or greater; and a second-stage polymerization step of adding an alkali metal hydroxide such that the alkali metal hydroxide is in an amount of 1.00 to 1.10 mol per 1 mol of the sulfur source, and continuing the polymerization reaction in a homogeneous liquid phase condition.

4 Claims, No Drawings

METHOD OF PRODUCING POLYARYLENE SULFIDE

TECHNICAL FIELD

The present invention relates to a method of producing polyarylene sulfide.

BACKGROUND ART

Polyarylene sulfide (hereinafter, also referred to as "PAS"), represented by polyphenylene sulfide (hereinafter, also referred to as "PPS"), is an engineering plastic having excellent heat resistance, chemical resistance, flame retardancy, mechanical strength, electrical characteristics, dimensional stability, and the like. PAS has been widely used in a wide variety of fields, such as electric/electronic devices and devices for automobiles, because PAS can be formed into various molded products, films, sheets, fibers, and the like by ordinary melt processing methods, such as extrusion molding, injection molding, and compression molding.

Examples of the method of producing PAS include methods described in Patent Documents 1 and 2.

CITATION LIST

Patent Literature

Patent Document 1: JP 2014-047218 A
Patent Document 2: WO 2006/046748

SUMMARY OF INVENTION

Technical Problem

In the method of producing PAS described in Patent Document 1, there is room for improvement in production steps because the production process is complicated due to the included concentration step. Furthermore, in the method of producing PAS described in Patent Document 2, because a phase separation agent is used and a special high-pressure reaction vessel is required, it is difficult to save resources, and cost tends to be high.

The present invention has been completed to solve the problems described above, and a main object thereof is to provide a method of producing PAS that can produce PAS at low cost while productivity enhancement and resource saving are attempted by avoiding the use of a complicated step and special apparatus (facility).

Solution to Problem

As a result of diligent research to achieve the object described above, the inventors of the present invention have found that the object described above can be achieved by, in a method of producing PAS, adjusting the content of the alkali metal hydroxide contained in the polymerization reaction system during process and by allowing the polymerization reaction to continue in a homogeneous liquid phase condition, and thus completed the present invention. That is, the method of producing PAS according to an embodiment of the present invention is described as below.

The method of producing PAS according to an embodiment of the present invention is a method of producing PAS in which a sulfur source and a dihalo aromatic compound are polymerized in an organic amide solvent, the method including:

a preparation step of preparing a mixture containing an organic amide solvent, a sulfur source, a dihalo aromatic compound, and an alkali metal hydroxide in an amount less than an equimolar amount relative to an amount of the sulfur source; a first-stage polymerization step of initiating a polymerization reaction by heating the mixture, and producing a prepolymer having a dihalo aromatic compound conversion ratio of 50% or greater; and a second-stage polymerization step of adding an alkali metal hydroxide such that the alkali metal hydroxide is in an amount of 1.00 to 1.10 mol per 1 mol of the sulfur source, and continuing the polymerization reaction in a homogeneous liquid phase condition.

By this, the production method described above exhibits an effect of producing PAS at low cost while productivity enhancement and resource saving are attempted by avoiding the use of a complicated step and special apparatus (facility).

In the method of producing PAS according to an embodiment of the present invention, in the preparation step, the mixture containing from 0.5 to 0.99 mol of the alkali metal hydroxide per 1 mol of the sulfur source is preferably prepared.

In the method of producing PAS according to an embodiment of the present invention, in the first-stage polymerization step, the prepolymer having the dihalo aromatic compound conversion ratio of 50 to 98% is preferably produced.

In the method of producing PAS according to an embodiment of the present invention, in the second-stage polymerization step, a water content per 1 kg of the organic amide solvent is preferably in a range of 0.01 to 3.7 mol.

The method of producing PAS according to an embodiment of the present invention preferably includes no sieving step of sieving PAS.

Advantageous Effects of Invention

The method of producing PAS of an embodiment of the present invention has a second-stage polymerization step in which an alkali metal hydroxide is added and the polymerization reaction is continued in the homogeneous liquid phase condition. Because of this, in the embodiment of the present invention, the polymerization reaction in the second-stage polymerization step can be performed in a lower pressure condition compared to the case where a phase separation agent is added in the second-stage polymerization step. That is, for example, because use of a special step such as a concentration step and use of special apparatus such as a high-pressure reaction vessel are not necessary, cost required for apparatus (facility) to produce PAS can be reduced while productivity enhancement and resource saving are attempted. Because of this, an effect of producing a high molecular weight polyarylene sulfide at low cost is achieved while productivity is enhanced and resources are saved.

DESCRIPTION OF EMBODIMENTS

I. Method of Producing PAS

An embodiment of the method of producing PAS according to the present invention is described hereinafter. The method of producing PAS in the present embodiment has, as main steps, a preparation step, a first-stage polymerization step, and a second-stage polymerization step. Furthermore, as desired, the production method may have a dehydration step and a post-treatment step. Each of the steps is described in detail below.

Dehydration Step

The dehydration step is a step that, before the preparation step, discharges a distillate containing water from the reaction system, the reaction system containing a mixture containing an organic amide solvent, a sulfur source, and an alkali metal hydroxide, during the polymerization reaction to the outside the reaction system.

The polymerization reaction of the sulfur source and the dihalo aromatic compound is affected, e.g. promoted or inhibited, by the amount of water present in the polymerization reaction system. Therefore, as long as the water content is a water content that does not inhibit the polymerization reaction, the dehydration step is not necessary; however, the water content of the polymerization reaction system is preferably reduced by performing the dehydration step before the polymerization.

In the dehydration step, the dehydration is preferably performed by heating in an inert gas atmosphere. The dehydration step is performed in a reaction vessel, and the distillate containing water is discharged outside the reaction vessel. Water to be dehydrated in the dehydration step includes hydrated water contained in the raw materials charged in the dehydration step, an aqueous medium of the aqueous mixture, water produced by a side reaction between the raw materials, and the like.

The heating temperature in the dehydration step is not limited as long as the heating temperature is 300° C. or lower but is preferably from 100 to 250° C. The heating time is preferably from 15 minutes to 24 hours, and more preferably from 30 minutes to 10 hours.

In the dehydration step, the dehydration is performed until the water content reaches a predetermined range. That is, in the dehydration step, the dehydration is preferably performed until the water content becomes preferably 0 to 2 mol, and more preferably from 0.5 to 1.8 mol, per 1 mol of the effective sulfur source. When the water content is too small in the dehydration step, the water content needs to be adjusted to a desired content by adding water in the preparation step performed before the polymerization step.

Preparation Step

The preparation step is a step that prepares a mixture containing an organic amide solvent, a sulfur source, a dihalo aromatic compound, and an alkali metal hydroxide. The mixture prepared in the preparation step is also referred to as "preparation mixture".

As described above, the dehydration step is preferably performed before the preparation step. Therefore, controlling of the pH and adjustment of the amount of each component in the preparation mixture are performed taking the amounts of the components in the mixture obtained in the dehydration step into consideration. Furthermore, the amount of the sulfur source in the preparation mixture (hereinafter, also referred to as an amount of "charged sulfur source" (effective sulfur source)) can be calculated by subtracting the molar quantity of the hydrogen sulfide volatilized in the dehydration step from the molar quantity of the sulfur source charged in the dehydration step.

The number of moles of the alkali metal hydroxide per 1 mol of the sulfur source (charged sulfur source) is preferably in a range of 0.5 to 0.99 mol, more preferably 0.7 to 0.98 mol, even more preferably 0.75 to 0.97 mol, and particularly preferably 0.8 mol or greater but less than 0.95 mol. The number of moles of the alkali metal hydroxide is calculated based on the number of moles of the alkali metal hydroxide added in the preparation step. In the case where the dehydration step is performed, the number of moles of the alkali metal hydroxide is calculated based on the number of moles of the alkali metal hydroxide added in the dehydration step and the number of moles of the alkali metal hydroxide generated due to generation of hydrogen sulfide in the dehydration step. When the sulfur source contains an alkali metal sulfide, the number of moles of the alkali metal hydroxide per 1 mol of the sulfur source (charged sulfur source) is calculated in a manner that the number of moles of the alkali metal sulfide is included. When the sulfur source contains hydrogen sulfide, the number of moles of the alkali metal hydroxide per 1 mol of the sulfur source (charged sulfur source) is calculated in a manner that the number of moles of the generated alkali metal sulfide is included. However, in the case where at least one type of acid selected from the group consisting of inorganic acids and organic acids is used for some reasons, the number of moles of the alkali metal hydroxide required to neutralize the at least one type of acid is not included in the number of moles of the alkali metal hydroxide per 1 mol of the sulfur source (charged sulfur source).

In the case where the dehydration step is performed, as necessary, in the preparation step, an alkali metal hydroxide and water can be added to the mixture remaining in the system after the dehydration step. In particular, the alkali metal hydroxide is added such that the number of moles of the alkali metal hydroxide becomes less than 1 mol per 1 mol of the sulfur source (charged sulfur source) taking the amount of the hydrogen sulfide generated during the dehydration and the amount of the alkali metal hydroxide generated during the dehydration into account.

When the number of moles of the alkali metal hydroxide per 1 mol of the sulfur source is less than 1 mol, generation of byproducts during polymerization reaction may be suppressed, the nitrogen content derived from impurities in the produced PAS may be made sufficiently small, and the yield of the PAS may be sufficiently enhanced. In the preparation step, a preparation mixture containing preferably from 0.95 to 1.2 mol, and more preferably from 1 to 1.09 mol, of the dihalo aromatic compound per 1 mol of the sulfur source is prepared.

The pH of the preparation mixture is not limited but is preferably higher than 12.5 but 14 or lower, more preferably from 12.6 to 14, and even more preferably from 12.7 to 13.9. The value of pH may be a predetermined value obtained by adjusting the proportion of each of the components such as alkali metal hydroxide. The pH can be easily adjusted to a value higher than 12.5 by setting the number of moles of the alkali metal hydroxide per 1 mol of the sulfur source (charged sulfur source) to within the range described above. As a result, the polymerization reaction can be stably performed while the generation of byproducts is suppressed, and a high quality PAS can be easily obtained. In the method of producing PAS according to an embodiment of the present invention, the polymerization reaction between the sulfur source and the dihalo aromatic compound is initiated by heating the preparation mixture in the first-stage polymerization step described below. When the pH of the preparation mixture is 12.5 or less at the beginning of the first-stage polymerization, it may be difficult to obtain high quality PAS even when an alkali metal hydroxide is added in the middle of the first-stage polymerization. Note that, when the pH of the preparation mixture is too high, deterioration in the organic amide solvent may be increased and abnormal reaction and/or decomposition reaction may occur during the polymerization as a result of too high abundance of the alkali metal hydroxide.

Note that, as the organic amide solvent, the sulfur source, the dihalo aromatic compound, and the alkali metal hydroxide, those typically used in production of PAS can be used. Examples of the organic amide solvent include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-diallyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfide, alkali metal hydrosulfide, and hydrogen sulfide.

Examples of alkali metal hydrosulfides include lithium hydrosulfide, sodium hydrosulfide, potassium hydro sulfide, rubidium hydrosulfide, and cesium hydro sulfide.

Examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. A halogen atom is each atom of fluorine, chlorine, bromine, and iodine, and the two halogen atoms in the dihalo aromatic compound may be the same or different.

As the alkali metal hydroxide, lithium hydroxide, sodium hydroxide, potassium hydroxide, rubidium hydroxide, and cesium hydroxide can be used.

These materials may be used alone or may be used by mixing two or more types as long as the combination can produce the PAS.

Polymerization Step

The polymerization step is a step of polymerizing a PAS by subjecting the sulfur source and the dihalo aromatic compound to a polymerization reaction. The polymerization step includes two steps which are a first-stage polymerization step and a second-stage polymerization step. Each of the steps is described below.

First-Stage Polymerization Step

The first-stage polymerization step is a step of initiating a polymerization reaction by heating the mixture and produces a prepolymer having a dihalo aromatic compound conversion ratio of 50% or greater.

The polymerization reaction may be carried out in batches, continuous mode or a combination of both methods. In the batch polymerization, a method in which two or more reaction vessels are used may be employed to shorten the polymerization cycle time. In the first-stage polymerization step and the second-stage polymerization step, homogeneous polymerization is preferable, that is, the polymerization reaction is preferably performed in the condition where the PAS and the organic amide solvent form a homogeneous liquid phase. In many cases, in the first-stage polymerization step, the polymerization reaction is performed in the reaction system in which the produced polymer is uniformly dissolved in the organic amide solvent.

In the first-stage polymerization step, preferably, a polymerization reaction is initiated by heating the mixture prepared in the preparation step, i.e. the preparation mixture, to a temperature of 170 to 270° C. and a prepolymer having a dihalo aromatic compound conversion ratio of 50% or greater is produced. The polymerization temperature in the first-stage polymerization step is preferably selected from the range of 180 to 265° C. from the perspective of suppressing side reactions and decomposition reactions.

The dihalo aromatic compound conversion ratio is preferably from 50 to 98%, more preferably from 55 to 97%, even more preferably from 60 to 96%, and particularly preferably from 62 to 95%. The conversion ratio of the dihalo aromatic compound can be calculated by determining the amount of the dihalo aromatic compound remaining in the reaction mixture by gas chromatography and then performing a calculation based on the remaining amount of the dihalo aromatic compound, the charged amount of the dihalo aromatic compound, and the charged amount of the sulfur source.

In the first-stage polymerization step, the preparation mixture having a pH of higher than 12.5 but 14 or lower is preferably used to initiate the polymerization reaction. As long as this condition is employed, the amount of at least one of water, the alkali metal hydroxide, and the organic amide solvent may be varied in the middle of the polymerization reaction. For example, water and the alkali metal hydroxide may be added to the reaction system in the middle of the polymerization. However, in the first-stage polymerization step, typically, the preparation mixture prepared in the preparation step is preferably used to initiate the polymerization reaction and terminate the first-stage polymerization reaction.

Second-Stage Polymerization Step

In the second-stage polymerization step, the polymerization reaction is continued in a homogeneous liquid phase condition by adding alkali metal hydroxide such that the amount of the alkali metal hydroxide becomes from 1.00 to 1.10 mol per 1 mol of the sulfur source, in the prepolymer produced by the first-stage polymerization step and making the reaction system a homogeneous liquid phase.

For the polymerization temperature in the second-stage polymerization step, the polymerization reaction is continued by heating to preferably 245 to 290° C., and more preferably 257 to 285° C. The polymerization temperature may be maintained at a fixed temperature or may be increased or decreased stepwise as necessary. The temperature is preferably maintained at a fixed temperature from the perspective of controlling the polymerization reaction. The polymerization reaction time is typically in the range of from 10 minutes to 72 hours, and preferably from 30 minutes to 48 hours.

In the second-stage polymerization step, the amount of the added alkali metal hydroxide is typically from 0.01 to 0.6 mol, preferably from 0.02 to 0.4 mol, more preferably from 0.03 to 0.35 mol, and particularly preferably from 0.06 to 0.3 mol, per 1 mol of the sulfur source. In the second-stage polymerization step, the alkali metal hydroxide is preferably added in a regulated manner that the total amount of the alkali metal hydroxide becomes preferably from 1.00 to 1.1 mol, more preferably from 1.01 to 1.08 mol, and even more preferably from 1.02 to 1.06 mol, per 1 mol of the sulfur source. When the total amount of the alkali metal hydroxide per 1 mol of the sulfur source is too small, PAS having a desired degree of polymerization may not be obtained. The total amount of the alkali metal hydroxide is the total of the amount of the alkali metal hydroxide present in the preparation mixture, the amount of the alkali metal hydroxide added in the second-stage polymerization step, and the amount of the alkali metal hydroxide optionally added in the first-stage polymerization step.

The time at which the alkali metal hydroxide is added may be at the beginning of the second-stage polymerization step or in the middle of the second-stage polymerization step.

Furthermore, the alkali metal hydroxide may be added at once or intermittently or continuously. When the alkali metal hydroxide is not added in the second-stage polymerization step, formation of byproducts may not be suppressed, the amount of impurities may be increased, and it may become difficult to stably obtain PAS having a high melt viscosity.

Because water is a phase separation agent, the water content is preferably controlled such that the homogeneous liquid phase condition is maintained in the second-stage polymerization step. The water content in the reaction system is typically 4 mol or less, preferably from 0.01 to 3.7 mol, more preferably from 0.1 to 3.5 mol, and particularly preferably from 0.5 to 3.4 mol, per 1 kg of the organic amide solvent.

PAS Polymerization Reaction Solution

In an embodiment of the present invention, generation of byproduct is suppressed in the method of producing PAS in which the sulfur source and the dihalo aromatic compound are polymerized in the organic amide solvent in the PAS polymerization reaction solution after the initiation of the polymerization reaction (hereinafter, also simply referred to as "PAS polymerization reaction solution").

Note that the byproduct refers to chlorophenyl methyl amino butanoic acid (hereinafter, also referred to as "CPMABA") and phenol. In the PAS polymerization reaction solution, the content of the CPMABA is 16000 ppm or less. Furthermore, the content of the phenol is suppressed to 2100 ppm or less. Therefore, according to the method of producing PAS of an embodiment of the present invention, the PAS having an average particle size of 10 to 100 μm, a melt viscosity of 0.1 to 3000 Pa·s measured at a temperature of 310° C. and a shear rate of 1216 sec$^{-1}$, and a nitrogen content of 900 ppm or less described below can be obtained at a high yield.

Hereinafter, the produced amount of CPMABA and phenol in the PAS polymerization reaction solution and the measurement method thereof are described.

Produced Amount of CPMABA

The produced amount of CPMABA in the PAS polymerization reaction solution is preferably 16000 ppm or less, and more preferably 15000 ppm or less. The lower limit of the produced amount of CPMABA is preferably 0 ppm but may be approximately 100 ppm.

The content of CPMABA in the PAS polymerization reaction solution (hereinafter, also referred to as "produced amount of CPMABA") can be measured by the following method.

A slurry content that is in the reactor and that contains the PAS after the completion of the polymerization reaction is cooled to room temperature, and then, using a part thereof, only a liquid component is isolated via centrifugal separation. The isolated liquid component is precisely weighed in a volumetric flask, mixed with an aqueous solution having 40 mass % of acetonitrile content, and the mixture was then agitated to extract CPMABA. The solution in which the CPMABA is extracted is filtered using a membrane filter, and the content of the CPMABA is measured using this filtrate as a measurement sample. The measurement is performed by using the synthesized CPMABA as a standard substance by high-performance liquid chromatography (HPLC) to quantify the CPMABA in the measurement sample, and this quantity is used as the produced amount of the CPMABA (unit: ppm). Thereafter, as necessary, the number of moles of the CPMABA per 1 mol of the sulfur source may be calculated and used as the produced amount of the CPMABA (unit: mmol/mol), which is a byproduct.

Produced Amount of Phenol

The produced amount of phenol in the PAS polymerization reaction solution is preferably 3100 ppm or less, more preferably 2100 ppm or less, and particularly preferably 2000 ppm or less. The lower limit of the produced amount of phenol is preferably 0 ppm but may be approximately 100 ppm.

The content of phenol in the PAS polymerization reaction solution (hereinafter, also referred to as "produced amount of phenol") can be measured by the following method.

That is, a slurry content that is in the reactor and that contains the PAS after the completion of the polymerization reaction is cooled to room temperature, and then, using a part thereof, only a liquid component is isolated via centrifugal separation. The liquid component is precisely weighed in a volumetric flask, mixed with acetone, and the mixture was then agitated to extract phenol. The content of the phenol was measured using the solution in which the phenol was extracted as a measurement sample. The measurement is performed by using phenol, available from Wako Pure Chemical Industries, Ltd., as a standard substance by gas chromatography (GC) to quantify the phenol in the measurement sample, and this quantity was used as the produced amount of the phenol (unit: ppm). Thereafter, as necessary, the number of moles of the phenol per 1 mol of the sulfur source may be calculated and used as the produced amount of the phenol (unit: mmol/mol), which is a byproduct.

Post-Treatment Step

The post-treatment step is a step of obtaining polyarylene sulfide by removing unnecessary components from the slurry obtained in the polymerization step. The post-treatment step in the method of producing PAS of an embodiment of the present invention is not limited as long as the step is a step typically used in production of PAS.

After the completion of the polymerization reaction, a slurry containing the polymer (hereinafter, also referred to as "product slurry") may be obtained by cooling the reaction mixture, for example. The cooled product slurry is separated by filtration as is or after diluted with water or the like, then washed and filtered repeatedly, and dried, whereby PAS can be recovered.

According to the method of producing PAS of an embodiment of the present invention, fine powder PAS can be produced, and thus the fine powder polymer can be isolated from the reaction solution by various solid-liquid separation methods.

The fine powder PAS obtained by the production method of an embodiment of the present invention has a narrow particle size distribution and high homogeneity. Therefore, in the production method of an embodiment of the present invention, sieving of the PAS is not necessary to control the particle size distribution. In the production method of an embodiment of the present invention, because the sieving of PAS is not performed, the number of steps can be reduced, and thus the productivity tends to be enhanced. Furthermore, typically, when the target fraction and the disposed fraction are separated by sieving, loss tends to occur and yield tends to decrease because it is not possible to prevent the component of the target fraction from being mixed into the disposed fraction. However, in the production method of an embodiment of the present invention, in the case where no sieving of PAS is performed, loss is less likely to occur and yield tends to be enhanced. Therefore, the method of producing PAS according to an embodiment of the present invention preferably includes no sieving step of sieving polyarylene sulfide.

After various solid-liquid separation, the PAS is preferably washed with the organic amide solvent, which is the same as the polymerization solvent, or an organic solvent, such as ketones (e.g. acetone) and alcohols (e.g. methanol). The PAS may be washed with high temperature water or the like. The produced PAS may be treated with acids or salts, such as ammonium chloride.

Obtained PAS

According to the method of producing PAS of the present invention, formation of byproduct is suppressed, and high quality PAS having less impurities can be obtained. As the PAS obtained by the production method of an embodiment of the present invention, PAS with excellent handleability can be obtained at a high yield by setting the average particle size to typically 10 to 100 µm, preferably 15 to 80 µm, and even more preferably 20 to 60 µm, and a melt viscosity, measured at a temperature of 310° C. and a shear rate of 1216 sec$^{-1}$, to typically 0.1 to 3000 Pa·s, preferably 0.5 to 200 Pa·s, more preferably 1 to 100 Pa·s, and even more preferably 3 to 50 Pa·s. Note that the melt viscosity of PAS can be measured by using approximately 20 g of dried polymer and using a capirograph at a predetermined temperature and shear rate condition.

The PAS obtained by the method of producing PAS of an embodiment of the present invention is high quality PAS having less impurities. An example of the indicator of high quality is a nitrogen content in the PAS. According to the method of producing PAS of an embodiment of the present invention, preferably, PAS having a nitrogen content of 900 ppm or less in the PAS can be obtained. The nitrogen content in the PAS is more preferably 850 ppm or less, and even more preferably 830 ppm or less. The lower limit of the nitrogen content in the PAS is of course 0 ppm; however, in many cases, the lower limit may be approximately 10 ppm.

The nitrogen content in the PAS can be measured by precisely weighing approximately 1 mg of a polymer sample and performing elemental analysis using a trace nitrogen and sulfur analyzer.

The PAS obtained by the method of producing PAS of an embodiment of the present invention can be formed into various injection molded products or extrusion molded products, such as sheets, films, fibers, and pipes, as is or after undergoing oxidative-crosslinking, alone or by blending with various inorganic fillers, fibrous fillers, and various synthetic resins, as desired.

The PAS obtained by the method of producing PAS of an embodiment of the present invention exhibits excellent color tone. Furthermore, the PAS compound obtained by the production method of the present invention produces a less amount of volatile components and is suitable for fields, such as electronic devices, where suppression of volatile components is expected.

In the method of producing PAS of an embodiment of the present invention, the PAS is not limited and is preferably polyphenylene sulfide (PPS).

The present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Embodiments of the present invention will be described in further detail hereinafter using examples. The present invention is not limited to the examples below, and it goes without saying that various aspects are possible with respect to the details thereof.

Example 1

1. Dehydration Step

As the sulfur source, 2001 g of sodium hydrosulfide (NaSH) aqueous solution having the analytical value by iodimetry of 62.37 mass % was used. The analytical value of NaSH by neutralization titration of this sulfur source was 61.25 mass % (21.86 mol), and 0.29 mol of sodium sulfide (Na$_2$S) was contained in the sulfur source. The sodium hydrosulfide aqueous solution described above and 1032 g of 73.65 mass % sodium hydroxide (NaOH) aqueous solution were charged in a 20 L autoclave (reactor), in which the inner side was lined with titanium, together with 5001 g of N-methyl-pyrrolidone (NMP). When the sulfur source formed from the sodium hydrosulfide and the sodium sulfide is denoted as "S", NaOH/S before the dehydration was 0.87 (mole/mole; hereinafter, also referred to as "mol/mol"). After the inside of the reactor was purged with nitrogen gas, the temperature was gradually raised to 200° C. over a period of approximately two hours while the contents in the reactor were being stirred, thereby 1078 g of water and 1226 g of NMP were distilled. At this time, 0.39 mol of hydrogen sulfide (H$_2$S) was volatilized. Therefore, the effective S amount (i.e. amount of "charged sulfur source") in the reactor after the dehydration step was 21.76 mol. The volatilized H$_2$S content corresponded to 1.77 mol % relative to the sulfur source charged in the reactor.

2. Preparation Step

After the dehydration step, the reactor was cooled to a temperature of 170° C., and 3247 g of p-dichlorobenzene (hereinafter, also referred to as "pDCB") (pDCB/effective S=1.01 (mol/mol)), 2589 g of NMP (NMP/effective S=291 (g/mol)), and 40 g of water were added. Furthermore, NaOH with a purity of 97 mass % was added in a manner that NaOH in reactor/effective S=0.91 (mol/mol) to obtain a preparation mixture (total water content in reactor/NMP=2.8 (mol/kg)).

3. Polymerization Step

While the preparation mixture was stirred by rotating a stirrer installed in the reactor, a polymerization was performed while the temperature was continuously raised from 200° C. to 220° C. over 20 minutes, and then the temperature was continuously raised to 255° C. over 70 minutes (first-stage polymerization step). The pDCB conversion ratio was 83%.

Thereafter, 61 g of water and 104 g of NaOH were charged under pressure (total water content in reactor/NMP=3.29 (mol/kg); total NaOH/effective S=1.026 (mol/mol)), and then the temperature was raised to 255° C. to a perform polymerization reaction for 1.5 hours in a state of homogeneous liquid phase (second-stage polymerization step). After the completion of the polymerization reaction, the reaction mixture was cooled to room temperature, and using a part thereof as a sample, the produced amount of byproducts in the PAS polymerization reaction solution was measured. Furthermore, when the reaction mixture after the completion of the polymerization reaction was placed in a pressure-resistant and alkali-resistant glass ampoule and visually observed at 255° C., the liquid phase except the byproduct NaCl was homogeneous.

pH of Polymeric Slurry

The slurry after the polymerization was diluted 10 times with purified water (available from Kanto Chemical Co., Inc.), and then pH was measured at room temperature using a pH meter.

4. Post-Treatment Step

After the reaction mixture was cooled to room temperature following the completion of the polymerization reaction as described above, the polymer (fine powder polymer) was separated by filtration using a filter paper. The separated polymer was washed three times with acetone, then washed three times with water, washed with 0.3 mass % acetic acid, and washed four times with water to obtain a washed polymer. The washed polymer was dried at a temperature of 105° C. for 13 hours. The yield of the fine powder polymer obtained as described above was 98%. The characteristics of the polymer are shown in Table 1 together with the produced amount of byproducts and the like.

Example 2

The polymerization reaction, the post-treatment, and the drying were performed in the same manner as in Example 1 except for adjusting NaOH in reactor/effective S after the preparation step to 0.85 (mol/mol).

The pDCB conversion ratio during the first-stage polymerization was 82%. The yield of the fine powder polymer obtained as described above was 98%. The characteristics of the polymer are shown in Table 1 together with the produced amount of byproducts and the like.

Comparative Example 1

The polymerization reaction, the post-treatment, and the drying were performed in the same manner as in Example 1 except for setting total NaOH/effective S to 1.02 (mol/mol) in the preparation step, and not charging the water and the NaOH under pressure (maintained total NaOH/effective S=1.02 (mol/mol)) in the second-stage polymerization.

The pDCB conversion ratio during the first-stage polymerization was 84%. The yield of the fine powder polymer obtained as described above was 98%. The characteristics of the polymer are shown in Table 1 together with the produced amount of byproducts and the like.

Example 3

The same procedure as in Example 1 was performed except for adjusting NMP/effective S=216 (g/mol), pDCB/effective S=1.00 (mol/mol), and total water content in reactor/NMP=1.8 (mol/kg) after the preparation step. While the preparation mixture was stirred, the temperature was continuously increased from 200° C. to 230° C. over 3 hours (first-stage polymerization step). The pDCB conversion ratio was 65%. Thereafter, the same procedure as in Example 1 was performed except for charging water and NaOH under pressure (total water content in reactor/NMP=2.25 (mol/kg), total NaOH/effective S=1.00 (mol/mol)) and performing polymerization reaction at 230° C. for 3 hours, and then the temperature was raised to 250° C. to perform the polymerization reaction for 1 hour in a state of homogeneous liquid phase (second-stage polymerization step).

The characteristics of the polymer are shown in Table 1 together with the produced amount of byproducts and the like.

Comparative Example 2

The polymerization reaction, the post-treatment, and the drying were performed in the same manner as in Example 3 except for setting total NaOH/effective S to 1.00 (mol/mol) in the preparation step, not charging the NaOH under pressure (maintained total NaOH/effective S=1.00 (mol/mol)) in the second-stage polymerization, continuously increasing the temperature from 200° C. to 230° C. over 3 hours in the first-stage polymerization, not charging the water and the NaOH under pressure in the second-stage polymerization (maintained total NaOH/effective S=1.00 (mol/mol)), continuously increasing the temperature to 250° C. over 3 hours, and then maintained at 250° C. for 1 hour to perform the polymerization (second-stage polymerization step). The characteristics of the polymer are shown in Table 1 together with the produced amount of byproducts and the like.

TABLE 1

| | Polymerization | | Physical properties of | Nitrogen |
| --- | --- | --- | --- | --- |
| | First-stage polymerization NaOH/NaSH | Second-stage polymerization NaOH/NaSH | PPS Melt viscosity Pa · s | content of PPS ppm |
| Example 1 | 0.91 | 1.02 | 17 | 800 |
| Example 2 | 0.85 | 1.02 | 15 | 820 |
| Comparative Example 1 | 1.02 | 1.02 | 8 | 1020 |
| Example 3 | 0.91 | 1.00 | 12 | 660 |
| Comparative Example 2 | 1.00 | 1.00 | 5 | 840 |

| | Byproduct | | |
| --- | --- | --- | --- |
| | Phenol ppm | CPMABA ppm | Polymeric slurry pH |
| Example 1 | 1740 | 12500 | 9.2 |
| Example 2 | 1900 | 14500 | 9.7 |
| Comparative Example 1 | 2200 | 16500 | 8.5 |
| Example 3 | 3070 | 12000 | 8.0 |
| Comparative Example 2 | 3160 | 12000 | 7.4 |

As is clear from Table 1, according to the methods of producing PAS of Examples 1 and 2, the melt viscosities of the obtained PASs were high, and the produced amount of phenol and the produced amount of CPMABA, which were byproducts, were respectively 1740 ppm or 1900 ppm and 12500 ppm or 14500 ppm. That is, according to the method of producing PAS of an embodiment of the present invention practically performed in Examples 1 and 2, high molecular weight PAS with a high purity was obtained without a complicated step.

On the other hand, in Comparative Example 1, because the melt viscosity of the obtained PAS was lower than those of Examples 1 and 2 and the nitrogen amount, the phenol amount, and the CPMABA amount were greater, it was found that a high molecular weight PAS with a high purity was not obtained. That is, it was found that the production method of Comparative Example 1 easily caused side reactions and produced a low molecular weight PAS with a relatively low purity.

Similarly, according to the method of producing PAS of Example 3, it was found that the melt viscosity of the obtained PAS was high, and the produced amount of phenol which was the byproduct was small.

INDUSTRIAL APPLICABILITY

The method of producing PAS according to an embodiment of the present invention can be used as a preferable method of producing PAS used in a wide variety of fields, such as electric/electronic devices and devices for automobiles, as an engineering plastic.

The invention claimed is:

1. A method of producing polyarylene sulfide in which a sulfur source and a dihalo aromatic compound are polymerized in an organic amide solvent, the method comprising:
   a preparation step of preparing a mixture containing an organic amide solvent, a sulfur source, a dihalo aromatic compound, and an alkali metal hydroxide in an amount less than an equimolar amount relative to an amount of the sulfur source;
   a first-stage polymerization step of initiating a polymerization reaction by heating the mixture, and producing a prepolymer having a dihalo aromatic compound conversion ratio of 50% or greater; and
   a second-stage polymerization step of adding an alkali metal hydroxide such that the alkali metal hydroxide is in an amount of 1.00 to 1.10 mol per 1 mol of the sulfur source, and continuing the polymerization reaction in a homogeneous liquid phase condition,
   wherein, in the second-stage polymerization step, a water content per 1 kg of the organic amide solvent is in a range of 0.01 to 3.7 mol.

2. The method according to claim 1, wherein, in the preparation step, the mixture containing from 0.5 to 0.99 mol of the alkali metal hydroxide per 1 mol of the sulfur source is prepared.

3. The method according to claim 1, wherein, in the first-stage polymerization step, the prepolymer having the dihalo aromatic compound conversion ratio of 50 to 98% is produced.

4. The method according to claim 1, comprising no sieving step of sieving polyarylene sulfide.

* * * * *